(No Model.) 2 Sheets—Sheet 1.
G. A. ANDERSON.
STEAM ENGINE.

No. 576,751. Patented Feb. 9, 1897.

Witnesses
Frank G. Gregny
John O. Johnson

Inventor
Gustaf A. Anderson
By Attorney Herbert W. Fenner

THE NORRIS PETERS CO., PHOTO-LITHO., WASHINGTON, D. C.

(No Model.) 2 Sheets—Sheet 2.
G. A. ANDERSON.
STEAM ENGINE.
No. 576,751. Patented Feb. 9, 1897.
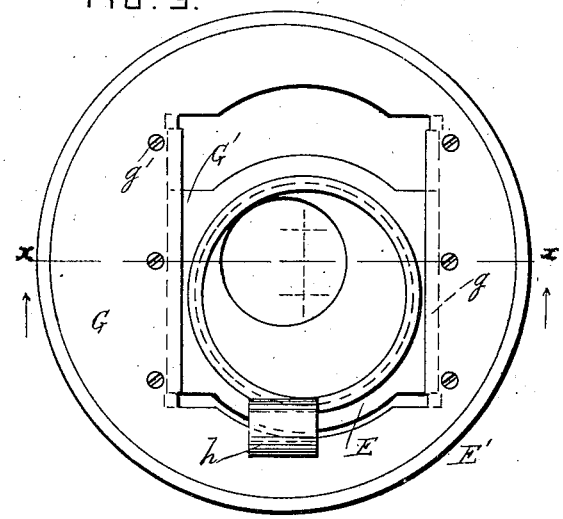
FIG. 3.
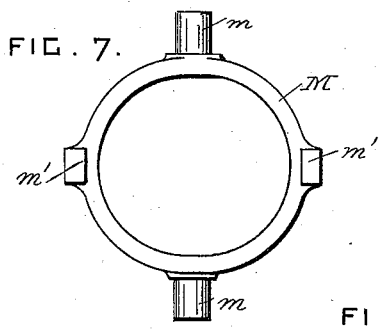
FIG. 7.
FIG. 8.
FIG. 9.
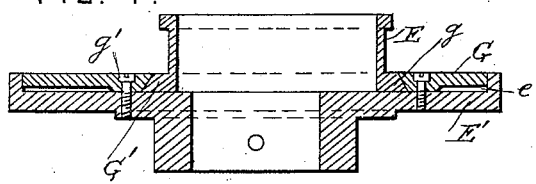
FIG. 4.
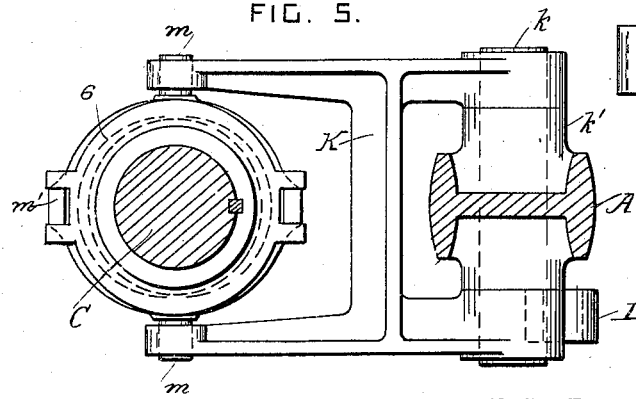
FIG. 5.
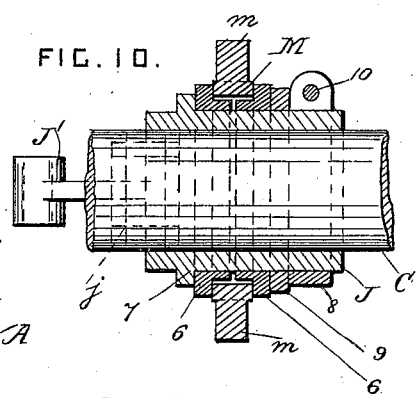
FIG. 10.
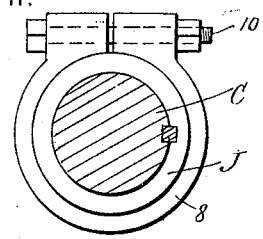
FIG. 11.
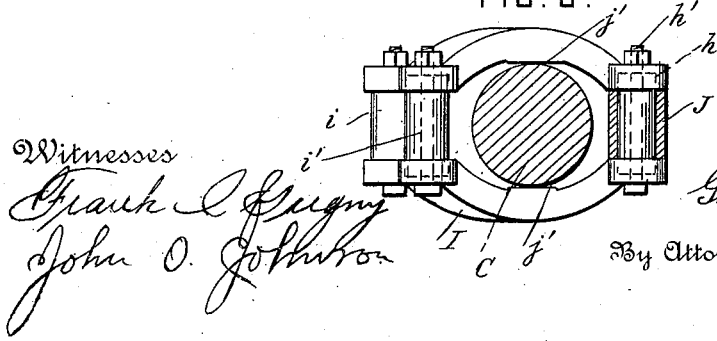
FIG. 6.
Witnesses
Frank C. Gugny
John O. Johnson
Inventor
Gustaf A. Anderson
By Attorney Herbert W. Jenner
THE NORRIS PETERS CO., PHOTO-LITHO., WASHINGTON, D. C.

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

STEAM-ENGINE.

SPECIFICATION forming part of Letters Patent No. 576,751, dated February 9, 1897.

Application filed April 9, 1896. Serial No. 586,779. (No model.)

*To all whom it may concern:*

Be it known that I, GUSTAF ARVID ANDERSON, a subject of the King of Sweden and Norway, residing at Waynesborough, in the county of Franklin and State of Pennsylvania, have invented certain new and useful Improvements in Steam-Engines; and I do hereby declare the following to be a full, clear, and exact description of the invention, such as will enable others skilled in the art to which it appertains to make and use the same.

This invention relates to steam-engines; and it consists in the novel construction and combination of the parts hereinafter fully described and claimed.

Figure 1:
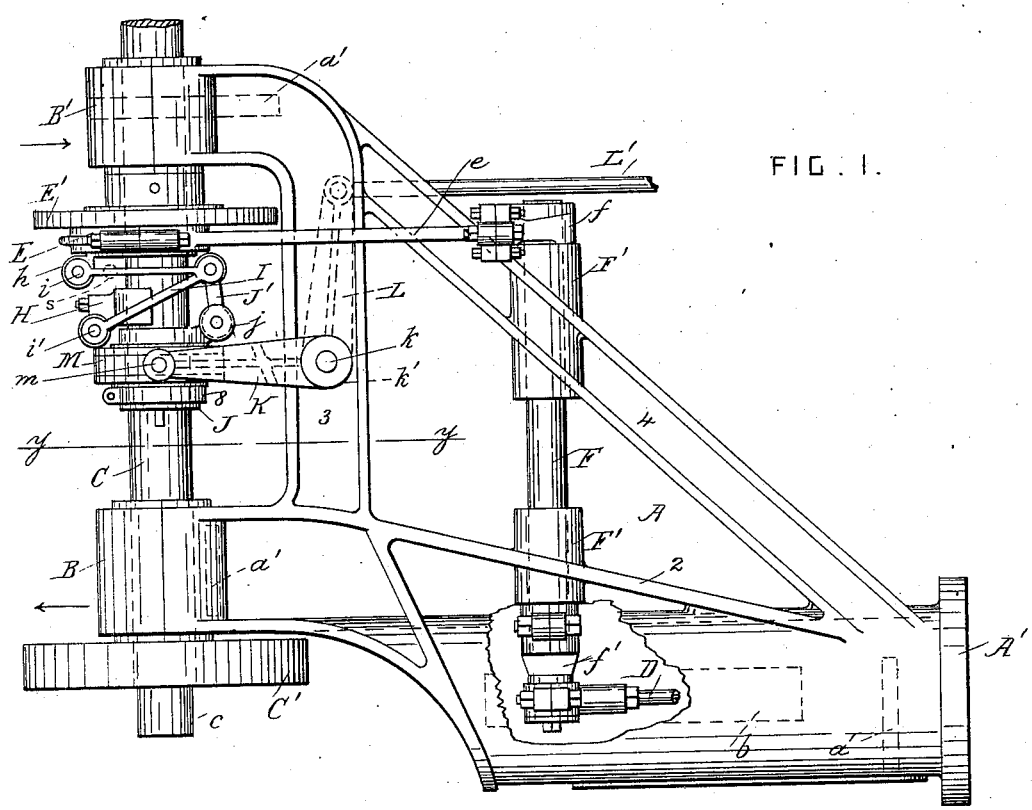
Figure 2:
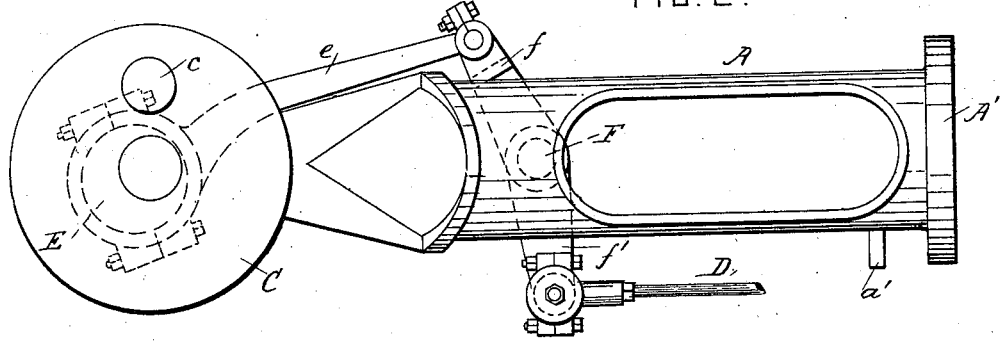

In the drawings, Figure 1 is a plan view of the engine-frame, showing also the means for reversing the valve. Fig. 2 is a front view of the same. Fig. 3 is a side view of the slidable eccentric and its driving-disk, drawn to a larger scale. Fig. 4 is a cross-section taken on the line $x\ x$ in Fig. 3. Fig. 5 is a cross-section through the crank-shaft, taken on the line $y\ y$ in Fig. 1, with the adjustable collar and washer removed. Fig. 6 is a detail side view of the links for shifting the eccentric. Fig. 7 is a detail side view of the elliptical ring. Fig. 8 is a side view of the rings which engage with the elliptical ring. Fig. 9 is a front view of the rings. Fig. 10 is a sectional front view of the rings, together with the slidable sleeve actuated by them. Fig. 11 is an end view of the adjustable collar and slidable sleeve, showing the crank-shaft in section.

A is the frame of the engine. This engine is of the kind known as "portable" engines or "traction-engines," such engines being usually mounted upon a boiler. For the purpose of supporting the engine the frame A is provided with lugs or brackets $a'$ on its under side. When mounted on a boiler, flexible expansion-plates are secured to the boiler and to these lugs, but the expansion-plates are not shown in the drawings, as they are of approved construction and do not form a part of the present invention.

The frame A is provided with a flange $A'$ at one end for the attachment of a steam-cylinder in the usual manner. At its other end the frame is provided with two bearings B and B' for the crank-shaft C to revolve in. C' is the crank-plate, and $c$ is the crank-pin. The cross-head guides $b$ are in the hollow portion of the frame in front of the flange $A'$ and are of approved construction.

In order that the frame may be perfectly rigid and inflexible and at the same time very strong and light, a straight bar 2 is provided and is arranged between the flange $A'$ and the bearing B, which is next to the crank-plate. This bar is inclined with respect to the axis of the cylinder. A straight bar 3 is also provided and extends between the bearings B and B', forming an obtuse angle with the bar 2. A third straight bar 4 is provided and extends between the flange $A'$ and the bearing B'. These three bars, which constitute the essential features of the frame, are cast integral with the other parts of the frame and form an obtuse-angled triangle, having the bearings B and B' at the ends of its base and the flange $A'$ at its apex parallel with its base and projecting in the opposite direction.

The bars 2, 3, and 4 are arranged upon the horizontal plane passing through the axes of the cylinder and crank-shaft and are placed in tension and compression alternately while the engine is at work, no part of the frame being subjected to any bending strain, and no strain being placed on the boiler except the downward pressure of the weight of the engine.

D is the valve-spindle. The slide-valve and cylinder are of approved construction and are not shown in the drawings.

E is the eccentric, and $e$ is the eccentric-rod. The valve-spindle is operated by the eccentric-rod through the medium of the rock-shaft F and the arms $f$ and $f'$, secured on it. The rock-shaft is journaled in bearings F' on the frame, and the arms $f$ and $f'$ are pivoted, respectively, to the eccentric-rod and to the valve-spindle. The valve-spindle may be arranged to be operated direct from the eccentric-rod without the intervention of a rock-shaft, if desired, both forms of connection being well known and in common use.

E' is a disk secured to the crank-shaft and provided with a recess $e$ on one side.

G is a circular plate fitting in the recess $e$ and provided with a dovetailed guide $g$.

G' is a slide formed on or otherwise secured to the eccentric E and slidable in the guide $g$. The plate G is secured to the disk by screws $g'$, and it may be taken out and renewed when the guide becomes worn. The eccentric-strap is journaled on the eccentric and is connected with the eccentric-rod in any approved manner.

The eccentric is reversed by moving its center across the center line of the shaft in a straight line, as indicated by dotted lines in Fig. 3.

The eccentric is moved by means of reversing-links.

H is a bracket secured to the crank-shaft.

I are reversing spring levers or links, a pair of links being preferably used. Each reversing-link is preferably V-shaped and is formed of resilient material. One free end of each link is pivoted to a lug $h$ on the eccentric by a pin $i$, and the other free end of each link is pivoted to the bracket H by a fulcrum-pin $i'$. The pin $i'$ is arranged midway of the two extreme positions occupied by the pin $i$ and to one side of its path of travel. The other extreme position of the pin $i$ is indicated by a dotted circle $s$ in Fig. 1.

J is a slidable operating-sleeve which is splined on the crank-shaft and is provided with a lug or double eye $j$ on the opposite side of the shaft from the lug $h$ on the eccentric. The links I extend across the shaft and their apices are pivotally connected to the lug $j$ by means of a short link J'. The pins pertaining to the links I preferably consist of short tubular cylinders of hard metal having their ends let into pockets $h$ in the links and clamped in position by bolts $h'$. The links I have, preferably, flat portions $j'$, which bear upon the shaft, which helps to steady the links.

The slide-valve is reversed by moving the sleeve J longitudinally of the shaft and thereby moving the center of the eccentric across the shaft.

The links I spring to adapt themselves to the tendency of the pivot-pins to move upon arcs and to the requirement that the eccentric shall move in a straight line transversely. Each link I might consist of two links pivoted to the short link J', but there would be a double thickness consisting of two superposed eyes to be pivoted to the link J', and it is therefore preferable to make each link V-shaped and with one eye at its apex.

Any approved means may be used for sliding the sleeve J upon the shaft, but by preference certain devices are used which will now be described.

K is a forked or double lever secured on a pin $k$, which is journaled in a bearing $k'$ on the frame. An arm L projects from the lower part of the lever K, forming, together with the said lever, a bell-crank.

L' is the reversing-rod, pivoted to the end of the arm L. The reversing-rod is moved back and forth and is retained in any desired position by any approved mechanism for that purpose.

M is an elliptical ring provided with two pivots $m$ at its narrow part, which engage with the free end portions of the lever K. The ring M has also two short rectangular bars $m'$, projecting crosswise at its wider part.

Two flanged rings 6 are journaled side by side on the sleeve J at a little distance apart, and the ring M engages laterally with the vertical flanges of these rings 6 but does not touch the peripheries of their horizontal flanges. The rings 6 are kept in position on the sleeve on one side by a stationary collar 7, and on the other side by an adjustable collar 8 and a washer 9. The collar 8 is preferably a split collar and is provided with a bolt 10 for clamping it in position. When the parts become worn away, the collar 8 is slid upon the sleeve and is reclamped, so as to take up the slack.

The rings 6 are provided with notches 11, into which the ends of the bars $m'$ fit loosely, so that the rings 6 are prevented from revolving. In this manner the wear comes upon the surfaces, which can be set up, when worn, by means of the adjustable collar 8.

The object in making the ring M elliptical and not allowing its internal periphery to touch the rings 6 is to permit it to have a slight sliding motion transversely between the rings 6. This sliding motion is caused by the pivots $m$ being moved on an arc having the pin $k$ as its center, by the motion of the lever K.

What I claim is—

1. In a steam-engine, a triangular frame comprising a bar 2 inclined horizontally with respect to the axis of the cylinder, a bar 3 forming an obtuse angle with the bar 2 and having bearings for the crank-shaft at its ends, and a bar 4 arranged opposite the said obtuse angle and provided with a flange for supporting the cylinder, said flange being arranged at the apex of the triangle and projecting substantially parallel with the bar 3, and upon the opposite side of the bar 2 from the said bar 3, all the said bars being arranged in the horizontal plane passing through the axes of the cylinder and crank-shaft, substantially as set forth.

2. The combination, with an engine crank-shaft, and a slidable eccentric revolving therewith; of a V-shaped spring-lever having its free ends pivotally connected to the said eccentric and crank-shaft upon the same side of the crank-shaft, and operating mechanism connected to the apex of the said lever, and operating to move its apex longitudinally, thereby sliding the eccentric transversely of the crank-shaft, substantially as set forth.

3. The combination, with an engine crank-shaft, and a slidable eccentric revolving therewith; of a pair of V-shaped spring-levers having their free ends pivotally connected to the said eccentric and crank-shaft upon the same side of the crank-shaft, a slidable operating-sleeve splined to the crank-shaft, and a link pivoted to the said sleeve and to the apices of the said levers, substantially as set forth.

4. The combination, with an engine crank-shaft, and a slidable eccentric revolving therewith; of a pair of V-shaped spring-levers having their free ends pivotally connected to the said eccentric and crank-shaft upon the same side of the crank-shaft, and provided with flat portions bearing on the crank-shaft; and operating mechanism connected to the apices of the said levers on the other side of the crank-shaft, substantially as set forth.

5. The combination, with an engine crank-shaft, and a slidable eccentric revolving therewith; of a pair of V-shaped spring-levers provided with sockets at their ends, tubular pins let into the said sockets, bolts passing through the said pins and clamping them in the said sockets, lugs on the crank-shaft and on the eccentric engaging with the said pins at the free ends of the levers; and operating mechanism connected to the pin at the apices of the levers, substantially as set forth.

6. The combination, with an engine crank-shaft, and a sleeve splined thereon and provided with a stationary collar; of a pivoted lever provided with a forked end, a ring operatively connected with the said lever and journaled on the said sleeve, and an adjustable collar mounted on the said sleeve and movable longitudinally thereof, the said ring being arranged between the two collars, substantially as set forth.

7. The combination, with an engine crank-shaft, and a sleeve splined thereon and provided with collars; of two rings journaled between the collars, a transversely-slidable ring arranged between the two said rings, and a pivoted lever provided with a forked end pivotally connected to the slidable ring, substantially as set forth.

8. The combination, with an engine crank-shaft, and a sleeve splined thereon and provided with collars; of two rings journaled between the said collars and provided with notches at their peripheries, a transversely-slidable ring arranged between the two said rings and provided with projecting bars engaging with the said notches; and a pivoted lever provided with a forked end pivotally connected to the slidable ring, substantially as set forth.

In testimony whereof I affix my signature in presence of two witnesses.

GUSTAF ARVID ANDERSON.

Witnesses:
DANIEL S. BEARD,
E. G. CLYMANS.